(12) United States Patent
Kuriki

(10) Patent No.: US 9,142,358 B2
(45) Date of Patent: Sep. 22, 2015

(54) POWER STORAGE DEVICE AND ELECTRIC DEVICE

(71) Applicant: Semiconductor Energy Laboratory Co., Ltd., Atsugi-shi, Kanagawa-ken (JP)

(72) Inventor: Kazutaka Kuriki, Ebina (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 38 days.

(21) Appl. No.: 13/800,544

(22) Filed: Mar. 13, 2013

(65) Prior Publication Data

US 2013/0252089 A1 Sep. 26, 2013

(30) Foreign Application Priority Data

Mar. 21, 2012 (JP) ................ 2012-063807

(51) Int. Cl.
| | |
|---|---|
| *H01G 9/048* | (2006.01) |
| *H01M 4/74* | (2006.01) |
| *H01G 11/04* | (2013.01) |
| *H01G 11/08* | (2013.01) |
| *H01G 11/28* | (2013.01) |
| *H01G 11/70* | (2013.01) |
| *H01M 4/131* | (2010.01) |
| *H01M 10/052* | (2010.01) |

(52) U.S. Cl.
CPC ............. *H01G 9/048* (2013.01); *H01G 11/04* (2013.01); *H01G 11/08* (2013.01); *H01G 11/28* (2013.01); *H01G 11/70* (2013.01); *H01M 4/74* (2013.01); *H01M 4/131* (2013.01); *H01M 10/052* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 4,916,035 A * | 4/1990 | Yamashita et al. ........... | 429/111 |
| 5,385,587 A | 1/1995 | Lund et al. | |
| 6,048,646 A | 4/2000 | Xing et al. | |
| 6,802,917 B1 | 10/2004 | Tomantschger et al. | |
| 7,179,561 B2 | 2/2007 | Niu et al. | |
| 7,745,047 B2 | 6/2010 | Zhamu et al. | |
| 7,842,432 B2 | 11/2010 | Niu et al. | |

(Continued)

FOREIGN PATENT DOCUMENTS

| | | |
|---|---|---|
| JP | 2006-265751 A | 10/2006 |
| JP | 2007-123081 A | 5/2007 |

(Continued)

OTHER PUBLICATIONS

Fang-Yuan Su et al.; "Flexible and planar grapheme conductive additives for lithium-ion batteries"; Journal of Materials Chemistry; 2010; pp. 9644-9650; vol. 20.

(Continued)

*Primary Examiner* — Patrick Ryan
*Assistant Examiner* — Christopher Domone
(74) *Attorney, Agent, or Firm* — Fish & Richardson P.C.

(57) ABSTRACT

Provided is a power storage device having a high discharge capacitance and a light-transmitting property. The power storage device includes a first current collector having a net-like planar shape; a first active material layer over the first current collector; a solid electrolyte layer over the first active material layer; a second active material layer over the solid electrolyte layer; and a second current collector over the second active material layer.

21 Claims, 7 Drawing Sheets

(56) References Cited

U.S. PATENT DOCUMENTS

| | | |
|---|---|---|
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 2008/0254296 A1 | 10/2008 | Handa et al. |
| 2010/0003599 A1* | 1/2010 | Nonoshita et al. ............ 429/209 |
| 2010/0143798 A1 | 6/2010 | Zhamu et al. |
| 2010/0176337 A1 | 7/2010 | Zhamu et al. |
| 2010/0243050 A1* | 9/2010 | Goldstein ..................... 136/256 |
| 2010/0248034 A1 | 9/2010 | Oki et al. |
| 2010/0330420 A1* | 12/2010 | Ogawa et al. ................ 429/209 |
| 2010/0330421 A1 | 12/2010 | Cui et al. |
| 2011/0012067 A1 | 1/2011 | Kay |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2012/0064402 A1 | 3/2012 | Tsuji et al. |
| 2012/0219862 A1 | 8/2012 | Fujino et al. |
| 2012/0276434 A1 | 11/2012 | Gaikwad et al. |

FOREIGN PATENT DOCUMENTS

| | | |
|---|---|---|
| JP | 2009-524567 A | 7/2009 |
| JP | 2009-176721 A | 8/2009 |
| JP | 2011-503804 A | 1/2011 |
| JP | 2011-517053 A | 5/2011 |
| WO | 2006/062947 A2 | 6/2006 |
| WO | 2007/061945 A2 | 5/2007 |
| WO | 2009/061685 A1 | 5/2009 |
| WO | 2009/127901 A1 | 10/2009 |
| WO | 2009/144600 A1 | 12/2009 |

OTHER PUBLICATIONS

Guihua Yu et al.; "Solution-Processed Graphene/MnO2 Nanostructured Textiles for High-Performance Electrochemical Capacitors"; Nano Letters; 2011; pp. 2905-2911; vol. 11, No. 7.

Xufeng Zhou et al.; "Graphene modified LiFePO4 cathode materials for high power lithium ion batteries"; Journal of Materials Chemistry; 2011; pp. 3353-3358; vol. 21.

* cited by examiner

POWER STORAGE DEVICE AND ELECTRIC DEVICE

BACKGROUND OF THE INVENTION

1. Field of the Invention

The present invention relates to an object (a product including a machine, a manufacture, and a composition of matter) and a method (a process including a simple method and a production method). In particular, one embodiment of the present invention relates to a power storage device and a manufacturing method thereof.

2. Description of the Related Art

In recent years, power storage devices such as nonaqueous secondary batteries (e.g., lithium secondary batteries), lithium ion capacitors, and air cells have been widely used as power supplies of consumer electric devices such as information terminals typified by mobile phones and smart phones, display devices like liquid crystal televisions, and game machines.

In particular, because of higher energy density than conventional batteries such as nickel-cadmium batteries, lithium secondary batteries are essential for information society these days as rechargeable energy supply sources for electric devices such as portable information terminals (e.g., mobile phones, smart phones, and laptop computers), portable music players, and digital cameras.

For example, lithium secondary batteries which are conventional nonaqueous secondary batteries each generally include positive electrodes and negative electrodes; the positive electrodes each include a positive electrode current collector made of sheet-like aluminum or the like and a positive electrode mix which includes a positive electrode active material capable of occluding and releasing lithium ions and which is applied to both surfaces of the positive electrode current collector, and the negative electrodes each include a negative electrode current collector made of sheet-like copper or the like and a negative electrode mix which includes a negative electrode active material capable of occluding and releasing lithium ions and which is applied to both surfaces of the negative electrode current collector. These positive electrodes and negative electrodes are rolled with a separator interposed therebetween to form a rolled body, a positive electrode tab and a negative electrode tab are connected to given portions of the positive electrodes and the negative electrodes, and an organic electrolytic solution and the rolled body where these tabs are connected to the given portions of the positive electrode and the negative electrode are sealed in an exterior body with a certain shape such as a cylindrical shape, a square shape, or a coin shape.

Further, in recent years, a solid secondary battery such as the solid secondary battery disclosed in Patent Document 1 has been actively researched. Such a solid secondary battery has a structure where an inorganic solid electrolyte or an organic polymer solid electrolyte is substituted for a conventional nonaqueous electrolytic solution and does not use a liquid material. Therefore, there is no concern for liquid leakage; further, since solid electrolytes are nonflammable, the danger of ignition can be avoided. The use of solid secondary batteries in this manner can increase safety and the structural strength of batteries. Further, simplification and enlargement of housings can be achieved. Therefore, solid secondary batteries have advantages over batteries using electrolytic solutions also in mass productivity.

REFERENCE

Patent Document

[Patent Document 1] Japanese Published Patent Application No. 2007-123081.

SUMMARY OF THE INVENTION

However, as for power storage devices in practical use, including lithium secondary batteries, regardless of whether they use organic electrolytic solutions or solid electrolytes, a material which does not have a light-transmitting property is used for a member included in the power storage devices, such as a positive electrode, a negative electrode, or a packaging can. Therefore, it is difficult to manufacture a power storage device that transmits light, and transparent power storage devices are not manufactured in the status quo. Accordingly, when an electric device such as a liquid crystal television or a solar cell is combined with a conventional power storage device, the position where the power storage device is provided in the electric device is restricted because the power storage device blocks light, resulting in restricted degree of freedom for design of the electric device.

In view of the above, it is an object of one embodiment of the present invention to provide a power storage device having a high discharge capacitance. It is an object of one embodiment of the present invention is to provide a transparent power storage device. It is an object of one embodiment of the present invention is to provide a novel power storage device.

Note that descriptions of these problems do not disturb the existence of other problems. Note that in one embodiment of the present invention, there is no need to achieve all the objects. Other objects will be apparent from and can be derived from the description of the specification, the drawings, the claims, and the like.

One embodiment of the present invention disclosed in this specification is a power storage device including a first current collector having a net-like planar shape; a first active material layer over the first current collector; a solid electrolyte layer over the first active material layer; a second active material layer over the solid electrolyte layer; and a second current collector over the second active material layer.

Another embodiment of the present invention is a power storage device including a first current collector comprising a net-like planar shape; a first active material layer over the first current collector; a solid electrolyte layer over the first active material layer; a second active material layer over the solid electrolyte layer; and a second current collector over the second active material layer, and in a part of a cross section of the first current collector, a ratio of a height to a width is more than 1.

Each of the power storage devices according to embodiments of the present invention includes at least a positive electrode, a negative electrode, and a solid electrolyte interposed therebetween. The positive electrode and the negative electrode face each other with the solid electrolyte interposed therebetween, one of which is positioned on a lower side and the other of which is positioned on an upper side. Therefore, when the positive electrode is positioned on a lower side, the first current collector is a positive electrode current collector and the first active material layer is a positive electrode active material layer. In this case, the second current collector is a negative electrode current collector and the second active material layer is a negative electrode active material layer. Alternatively, when the negative electrode is positioned on a lower side, the first current collector is a negative electrode current collector and the first active material layer is a negative electrode active material layer. In this case, the second current collector is a positive electrode current collector and the second active material layer is a positive electrode active material layer.

The first current collector is formed using a conductive member having a net-like planar shape. That is, the first current collector is a sheet-like or thin-plate-like member and has a net-like top surface when seen from the above. Here, the term "net-like" means a shape in which, for example, thin and long conductive members are stretched in a matrix on a plane, and is also referred to as a mesh or a grid. The term "net-like" does not only mean a state where a plurality of separate thin and long conductive members are woven, but also means a member in which thin and long portions (hereinafter referred to as a thin line portion) are integrated. In other words, the term "net-like" means a shape having a plurality of meshes, and a mesh refers to an opening of a conductive member through which light can pass. Since openings are arranged periodically, a net-like conductive member can also be referred to as an opening array.

A net-like first current collector according to one embodiment of the present invention is a structure for making a transparent power storage device. The larger the area of a mesh, the higher the transparency becomes. In other words, the smaller the width of a thin line portion of the first current collector, the higher the transparency becomes.

A thin line portion of the first current collector has a width of, for example, greater than or equal to 1 μm and less than or equal to 2000 μm, preferably greater than or equal to 10 μm and less than or equal to 1000 μm, in a planar shape. Further, an aperture ratio is greater than or equal to 20% and less than or equal to 95%, preferably greater than or equal to 30% and less than or equal to 80%. Here, an aperture ratio η (also referred to as a pore ratio) means an area ratio of openings to a minimum unit area where openings are arranged periodically. Specifically, the aperture ratio is shown by the following formula (I).

$$\eta = \frac{s}{S} \times 100 \qquad (1)$$

Here, s denotes an area of an opening and S denotes a minimum unit area of the net-like periodical arrangement. In order to express the aperture ratio in percentage, 100 is multiplied.

When the net-like shape of the first current collector is a grid shape as in FIG. 1A for example, an area s of an opening 102 is the product of a vertical side and a horizontal side of the opening, and a minimum unit area S of the net-like periodical arrangement is the product of a pitch (gap between thin line portions) between a thin line portion 101 in a vertical direction and an adjacent thin line portion 101 in a vertical direction and a pitch between a thin line portion 101 in a horizontal direction and an adjacent thin line portion 101 in a horizontal direction.

Meanwhile, a discharge capacitance, which is a fundamental function of a power storage device, is formed directly above the net-like first current collector. A capacitance is not formed in a mesh part (opening) of the first current collector. Therefore, the discharge capacitance is lost by the area where meshes are formed. In order to increase the discharge capacitance of the power storage device, a cross-sectional shape of the net-like first current collector is made to have a great height in a cross section perpendicular to a net-like planar surface. By making the first current collector high, the area of side surfaces of the first current collector is increased; therefore, by forming the discharge capacitance in the side surface portion, a power storage device having a high discharge capacitance can be manufactured.

Over the first current collector, a first active material layer, a solid electrolyte layer, a second active material layer, and a second current collector are formed by a sputtering method, an evaporation method, a plating method, a chemical vapor deposition method, or the like. Accordingly, the first current collector in a longitudinal cross-sectional direction is designed to have such a height that each layer can be formed by any of these methods. For example, the height of a thin line portion of the first current collector is set to be greater than or equal to 1 μm and less than or equal to 5000 μm, preferably greater than or equal to 10 μm and less than or equal to 2000 μm. In particular, in order to increase the discharge capacitance of the power storage device by increasing the side surface area of the first current collector, the first current collector is preferably designed to be high, and in a longitudinal cross section, the first current collector preferably has a part where the ratio of the height of the first current collector to the width of a thin line portion (aspect ratio of a thin line portion) is more than 1.

In a power storage device according to one embodiment of the present invention, the first active material layer, the solid electrolyte layer, the second active material layer, and the second current collector are stacked over the above-described first current collector, and the power storage device according to one embodiment of the present invention can have a predetermined discharge capacitance.

In such a power storage device according to one embodiment of the present invention, the first current collector has a net-like planar shape, and thus external light can pass through openings. Accordingly, an object behind the power storage device can be seen through the power storage device.

Thus, a power storage device having a high discharge capacitance and a light-transmitting property can be provided.

Further, the use of the solid electrolyte increases the strength and safety of the battery, and enables simplification or enlargement of the packaging can; accordingly, a power storage device with a higher mass productivity can be provided.

BRIEF DESCRIPTION OF THE DRAWINGS

In the accompanying drawings.

DETAILED DESCRIPTION OF THE INVENTION

Figure 1A:
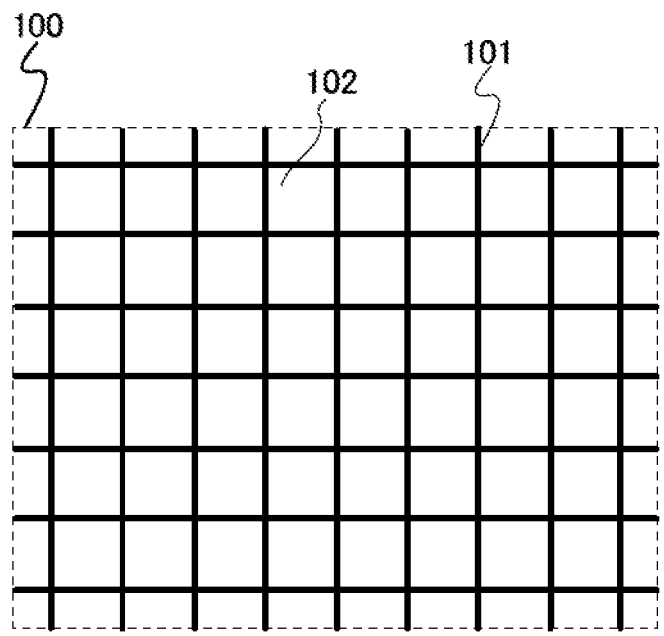
FIGS. 1A and 1B illustrate a power storage device.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

Note that in each drawing described in this specification, the size, the film thickness, or the region of each component is exaggerated for clarity in some cases. Therefore, embodiments of the present invention are not limited to such scales in the drawings or the like.

Embodiment 1

In this embodiment, a transparent lithium secondary battery will be described as a transparent power storage device with reference to FIGS. 1A and 1B, FIGS. 2A and 2B, and FIGS. 3A to 3F.

Note that a lithium secondary battery refers to a secondary battery using lithium ions as carrier ions. Examples of carrier ions which can be used instead of lithium ions include alkali-metal ions such as sodium ions and potassium ions; alkaline-earth metal ions such as calcium ions, strontium ions, and barium ions; beryllium ions; and magnesium ions.

Figure 1B:
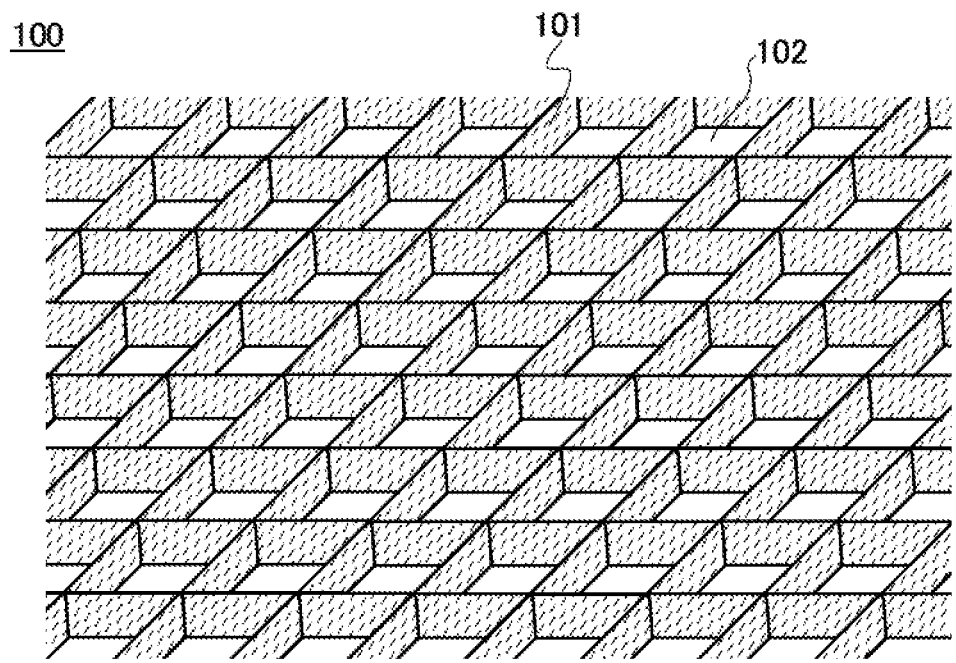

FIGS. 1A and 1B illustrate a power storage device described in this embodiment. A power storage device 100 is a structure body including at least a positive electrode, a negative electrode, and a solid electrolyte interposed therebetween. FIG. 1A is a plan view of the power storage device 100, and FIG. 1B illustrates a bird's-eye view of the power storage device 100. As illustrated in the plan view in FIG. 1A, the power storage device has a planar shape including the thin line portions 101 which are formed to be net-like (a net-like structure), and the openings 102 are provided in portions where the thin line portions 101 are not formed. In FIG. 1A, the thin line portions 101 are formed of a plurality of vertical lines and horizontal lines to have a periodical grid pattern. In other words, a plurality of square openings 102 are arranged such that most of the planar surface includes voids and the thin line portions 101 remain as a grid pattern.

Here, the term "net-like" means a shape in which, for example, thin and long conductive members are stretched in a matrix on a plane, and is also referred to as a mesh or a grid. The term "net-like" does not only mean a state where a plurality of separate thin and long conductive members are woven, but also means a member in which thin line portions are integrated. In other words, the term "net-like" means a shape having a plurality of meshes, and a mesh refers to an opening of a conductive member through which light can pass.

Further, as illustrated in the bird's-eye view in FIG. 1B, the thin line portions 101 have a predetermined height, so that the power storage device 100 has a three-dimensional structure. That is, since the thin line portions 101 have height, the opening 102 has a structure that is surrounded by four walls in four directions. By providing the thin line portions 101 with height in this manner, side surfaces of the thin line portion 101 are provided with a predetermined region where a discharge capacitance is formed.

Figure 2A:
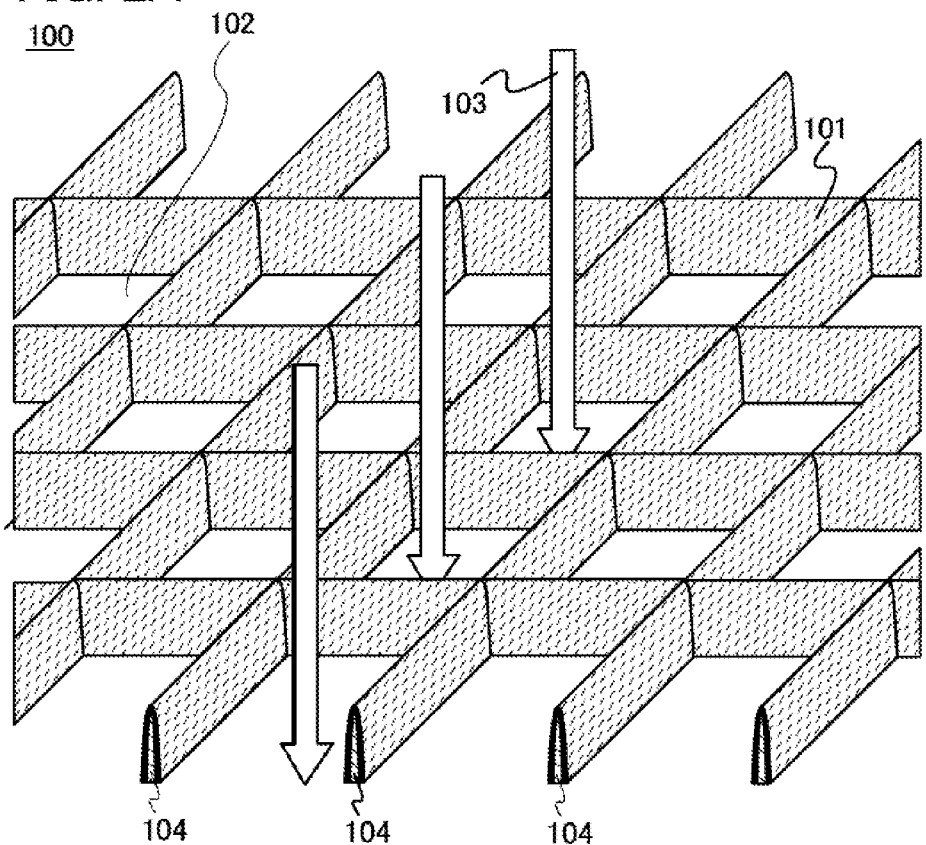
FIGS. 2A and 2B illustrate a power storage device.

FIG. 2A is a schematic view showing an enlarged part of FIG. 1B and further showing a cross-sectional shape. External light 103 passes through the openings 102 each surrounded by, in four directions, side surfaces of the thin line portions 101 having height. On the other hand, since the thin line portion 101 itself does not have a light-transmitting property, part of the external light is reflected or absorbed by the thin line portion 101.

Therefore, in the net-like power storage device 100, the larger the area of the openings 102 corresponding to meshes, the higher the transparency becomes. In other words, the smaller the width of the thin line portion 101, the higher the transparency becomes.

From the above, the thin line portion has a width of greater than or equal to 1 μm and less than or equal to 2000 μm, preferably greater than or equal to 10 μm and less than or equal to 1000 μm, in a planar shape of the power storage device. Further, an aperture ratio is greater than or equal to 20% and less than or equal to 95%, preferably greater than or equal to 30% and less than or equal to 80%.

Figure 2B:
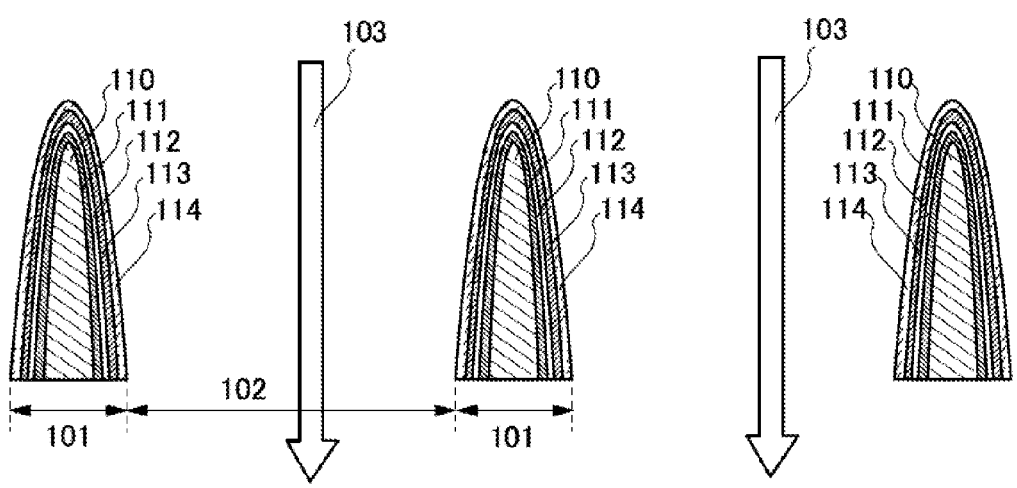

FIG. 2B is an enlarged view of a cross section 104 of the thin line portion 101 illustrated in FIG. 2A. The plurality of thin line portions 101 are arranged periodically and the external light 103 passes through the openings 102 among the thin line portions 101.

In the thin line portion 101, a first active material layer 111, a solid electrolyte layer 112, a second active material layer 113, and a second current collector 114 are stacked in this order over a first current collector 110. The first current collector 110 functions as a base portion for forming a stack of the thin line portion 101 and thus has a greater width than any other layer provided thereover. As described above, the thin line portion 101 has the predetermined height, and the height is generally determined by the height of the first current collector 110.

The first current collector illustrated in FIG. 2B has a parabola shape opening downward (or an arch shape). Such a shape facilitates stacking of the layers over the first current collector 110. That is, over the first current collector 110, the first active material layer 111, the solid electrolyte layer 112, the second active material layer 113, and the second current collector 114 are formed by a sputtering method, an evaporation method, a plating method, a chemical vapor deposition method, or the like. The first current collector 110 is therefore designed to have such a shape (e.g., the height or a tilt angle (also referred to as a tapered angle)) that each layer can be formed by any of these methods. For example, the height of a thin line portion of the first current collector 110 is set to be greater than or equal to 1 μm and less than or equal to 5000 μm, preferably greater than or equal to 10 μm and less than or equal to 2000 μm. The tilt angle of side surfaces of the first current collector is set to be greater than or equal to 60° and less than or equal to 90°, preferably greater than or equal to 65° and less than or equal to 90°. Further, in a similar manner, the size (area) of the above-described opening 102 is preferably set in accordance with methods and conditions for forming the stack, and one opening preferably has an area of 9 μm$^2$ or more, for example.

When a member at the outermost surface of the thin line portion 101 has a high reflectivity, reflection of the external light at the thin line portion 101 might decrease the transparency of the power storage device 100. Accordingly, the first current collector 110 may be designed to have such a wide tilt angle as to suppress the reflection.

FIG. 2B shows a parabola shape as a cross-sectional shape of the first current collector; however, the cross-sectional shape is not limited to this, but may be a dome shape, a hemispherical shape, a conical shape, a plate shape, or the like, which is open downward. In order that the power storage device 100 forms a capacitance, a stacked structure is formed over the side surfaces of the first current collector 110, and each film over the first active material layer 111 is not necessarily stacked in the vicinity of a top portion of the first current collector 110. Note that when the solid electrolyte layer 112 does not cover the vicinity of the top portion of the first current collector 110, the positive electrode and the negative electrode are short-circuited and a capacitance cannot be formed. Without limitation to the top portion of the first current collector 110, the short circuit between the positive electrode and the negative electrode needs to be prevented in any other portion; therefore, the cross-sectional shape needs to be designed such as not to induce the short circuit, as appropriate.

The positive electrode current collector, which is one of the first current collector 110 and the second current collector 114, can be formed using a metal film or foil of stainless steel, gold, platinum, aluminum, titanium, ITO (indium oxide-tin oxide), tin oxide, indium oxide, or the like. The negative electrode current collector, which is the other of the first current collector 110 and the second current collector 114, can be formed using a metal film or foil of stainless steel, gold, platinum, copper, nickel, cobalt, titanium, molybdenum, or the like. It is also possible to use a highly conductive material such as a stack or alloy of these materials. As an example of a stack of plural kinds of metals, a copper mesh whose surface is plated with gold may be used. It is further possible to use an aluminum alloy to which an element which improves heat resistance, such as silicon, titanium, neodymium, scandium, or molybdenum, is added.

In particular, the first current collector 110 is what is called a metal mesh, which is a conductor having a net-like planar shape. Thus, it is preferable to use a material with high processability, such as copper.

For a positive electrode active material layer, which is one of the first active material layer 111 and the second active material layer 113, a material that can insert and extract lithium ions can be used. For example, a lithium-containing composite oxide with an olivine crystal structure, a layered rock-salt crystal structure, or a spinel crystal structure can be given.

As the lithium-containing composite oxide with an olivine crystal structure, a composite oxide represented by a general formula LiMPO$_4$ (M is one or more of Fe(II), Mn(II), Co(II), and Ni(II)) can be given. Typical examples of the general formula LiMPO$_4$ include LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), LiFe$_f$Ni$_g$Co$_h$Mn$_i$PO$_4$ (f+g+h+i≤1, 0<f≤1, 0<g<1, 0<h<1, and 0<i<1), and the like.

LiFePO$_4$ is particularly preferable because it meets requirements with balance for a positive electrode active material, such as safety, stability, high capacity density, high potential, and existence of lithium ions that can be extracted in initial oxidation (charging).

Examples of the lithium-containing composite oxide with a layered rock-salt crystal structure include lithium cobalt oxide (LiCoO$_2$), LiNiO$_2$, LiMnO$_2$, Li$_2$MnO$_3$, an NiCo-based lithium-containing composite oxide (a general formula thereof is LiNi$_x$Co$_{1-x}$O$_2$ (0<x<1)) such as LiNi$_{0.8}$Co$_{0.2}$O$_2$, an NiMn-based lithium-containing composite oxide (a general formula thereof is LiNi$_x$Mn$_{1-x}$O$_2$ (0<x<1)) such as LiNi$_{0.5}$Mn$_{0.5}$O$_2$, and an NiMnCo-based lithium-containing composite oxide (also referred to as NMC, and a general formula thereof is LiNi$_x$Mn$_y$Co$_{1-x-y}$O$_2$ (x>0, y>0, x+y<1)) such as LiNi$_{1/3}$Mn$_{1/3}$Co$_{1/3}$O$_2$. Moreover, Li(Ni$_{0.8}$Co$_{0.15}$Al$_{0.05}$)O$_2$, Li$_2$MnO$_3$—LiMO$_2$ (M=Co, Ni, or Mn), and the like can be given.

LiCoO$_2$ is particularly preferable because it has high capacity, is more stable in the air than LiNi$_2$, and is more thermally stable than LiNiO$_2$, for example.

Examples of the lithium-containing composite oxide with a spinel crystal structure include LiMn$_2$O$_4$, Li$_{1+x}$Mn$_{2-x}$O$_4$, Li(MnAl)$_2$O$_4$, LiMm$_{1.5}$Ni$_{0.5}$O$_4$, and the like.

A lithium-containing composite oxide with a spinel crystal structure including manganese, such as LiMn$_2$O$_4$, is preferably mixed with a small amount of lithium nickel oxide (e.g., LiNiO$_2$ or LiNi$_{1-x}$MO$_2$ (M=Co, Al, or the like)), in which case elution of manganese is suppressed, for example.

As the positive electrode active material, a composite oxide represented by a general formula Li$_{(2-j)}$MSiO$_4$ (M is one or more of Fe(II), Mn(II), Co(II), and Ni(II); 0≤j≤2) can be used. Typical examples of the general formula Li$_{(2-j)}$MSiO$_4$ include Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), Li$_{(2-j)}$Fe$_r$Ni$_s$Co$_t$Mn$_u$SiO$_4$ (r+s+t+u≤1, 0<r<1, 0<s<1, 0<t<1, and 0<u<1), and the like.

Further, as the positive electrode active material, a nasicon compound represented by a general formula A$_x$M$_2$(XO$_4$)$_3$ (A=Li, Na, or Mg; M=Fe, Mn, Ti, V, Nb, or Al; and X=S, P, Mo, W, As, or Si) can be used. Examples of the nasicon compound include Fe$_2$(MnO$_4$)$_3$, Fe$_2$(SO$_4$)$_3$, Li$_3$Fe$_2$(PO$_4$)$_3$, and the like. Further alternatively, as the positive electrode active material, a compound represented by a general formula Li$_2$MPO$_4$F, Li$_2$MP$_2$O$_7$, or Li$_5$MO$_4$ (M=Fe or Mn); perovskite fluoride such as NaF$_3$ or FeF$_3$; metal chalcogenide such as TiS$_2$ or MoS$_2$ (sulfide, selenide, or telluride); a lithium-containing composite oxide with an inverse spinel crystal structure such as LiMVO$_4$; a vanadium oxide based material (e.g., V$_2$O$_5$, V$_6$O$_{13}$, and LiV$_3$O$_8$); a manganese oxide based material; an organic sulfur based material; or the like can be used.

In the case where carrier ions are alkali metal ions other than lithium ions, alkaline-earth metal ions, beryllium ions, or magnesium ions, the positive electrode active material layer may contain, instead of lithium in the lithium compound and the lithium-containing composite oxide, an alkali metal (e.g., sodium or potassium), an alkaline-earth metal (e.g., calcium, strontium, or barium), beryllium, or magnesium.

For a negative electrode active material layer, which is the other of the first active material layer 111 and the second active material layer 113, an alloy-based material which enables charge-discharge reaction by alloying and dealloying reaction with a lithium metal can be used. For example, a material including at least one of Al, Si, Ge, Sn, Pb, Sb, Bi, Ag, Zn, Cd, In, Ga, and the like can be given. Such elements have higher capacity than carbon. In particular, silicon has a theoretical capacity of 4200 mAh/g, which is significantly high. For this reason, silicon is preferably used as the negative electrode active material. Examples of the alloy-based material using such elements include SiO, Mg$_2$Si, Mg$_2$Ge, SnO, SnO$_2$, Mg$_2$Sn, SnS$_2$, V$_2$Sn$_3$, FeSn$_2$, CoSn$_2$, Ni$_3$Sn$_2$, Cu$_6$Sn$_5$, Ag$_3$Sn, Ag$_3$Sb, Ni$_2$MnSb, CeSb$_3$, LaSn$_3$, La$_3$Co$_2$Sn$_7$, CoSb$_3$, InSb, SbSn, and the like.

Alternatively, as the negative electrode active material, oxide such as titanium dioxide (TiO$_2$), lithium titanium oxide (Li$_4$Ti$_5$O$_{12}$), lithium-graphite intercalation compound (Li$_x$C$_6$), niobium pentoxide (Nb$_2$O$_5$), tungsten oxide (WO$_2$), molybdenum oxide (MoO$_2$), or the like can be used.

Further alternatively, as the negative electrode active material, Li$_{3-x}$M$_x$N (M=Co, Ni, or Cu) with a Li$_3$N structure, which is nitride of lithium and a transition metal, can be used. For example, Li$_{2.6}$Co$_{0.4}$N$_3$ is preferable because of high charge and discharge capacity (900 mAh/g).

Nitride of lithium and a transition metal is preferably used, in which case lithium ions are included in the negative electrode active material, and thus the negative electrode active material can be used in combination with a material for a positive electrode active material which does not include lithium ions, such as $V_2O_5$ or $Cr_3O_8$. Note that in the case of using a material including lithium ions as the positive electrode active material, the nitride of lithium and a transition metal can be used for the negative electrode active material by extracting lithium ions in advance.

In the case where silicon is used for the negative electrode active material, amorphous silicon, microcrystalline silicon, polycrystalline silicon, or a combination thereof can be used. In general, when crystallinity is higher, electric conductivity of silicon is higher; thus, silicon can be used for a power storage device as an electrode having high conductivity. On the other hand, more carrier ions such as lithium ions can be occluded in the case of amorphous silicon than in the case of crystalline silicon; therefore, discharge capacity can be increased.

The solid electrolyte layer 112 is formed using an inorganic solid electrolyte which can be formed by a sputtering method, an evaporation method, or a chemical vapor deposition method (specifically, a metal organic chemical vapor deposition method). As the inorganic solid electrolyte, a sulfide-containing solid electrolyte or an oxide-containing solid electrolyte can be used.

Examples of the sulfide-containing solid electrolyte include $Li_2S$—$SiS_2$—$Li_3PO_4$, $Li_2S$—$P_2S_5$, $Li_2S$—$SiS_2$—$Ga_2S_3$, $LiI$—$Li_2S$—$P_2S_5$, $LiI$—$Li_2S$—$B_2S_3$, $LiI$—$LI_2S$—$SiS_2$, $Li_3PO_4$—$Li_2S$—$SiS_2$, and $Li_4SiO_4$—$Li_2S$—$SiS_2$.

Examples of the oxide-containing solid electrolyte include LiPON, $Li_2O$, $Li_2CO_3$, $Li_2MoO_4$, $Li_3PO_4$, $Li_3VO_4$, $Li_4SiO_4$, LLT ($La_{2/3-x}Li_{3x}TiO_3$), and LLZ ($Li_7La_3Zr_2O_{12}$).

Alternatively, a polymer solid electrolyte such as PEO (polyethylene oxide) formed by a coating method or the like may be used. Further alternatively, a composite solid electrolyte containing the above-described inorganic solid electrolyte and the polymer solid electrolyte may be used.

Next, power storage devices having planar shapes different from the planar shapes illustrated in FIGS. 1A and 1B and FIGS. 2A and 2B will be described with reference to FIGS. 3A to 3F.

Figure 3A:
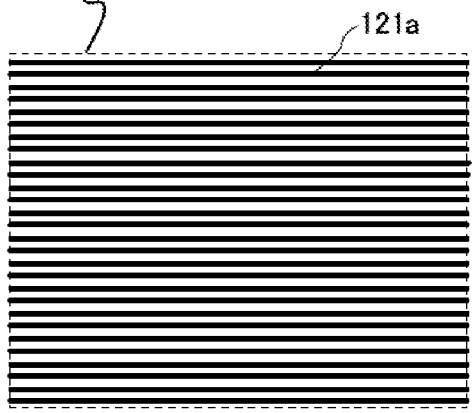
FIGS. 3A to 3F illustrate planar shapes of current collectors.

FIG. 3A is a plan view of a power storage device 120a in which a plurality of thin line portions 121a are arranged at regular intervals only in a horizontal direction. Openings where the thin line portions 121a are not formed function as slits, so that external light passes through the openings.

Figure 3B:
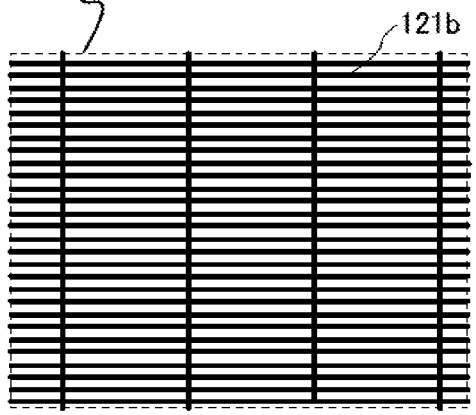

FIG. 3B is a plan view of a power storage device 120b in which vertical thin line portions are added to the planar shape of FIG. 3A, so that grid-like thin line portions 121b are formed. Because of the addition of the vertical thin line portions, mechanical strength and a discharge capacitance to be formed are higher than those of the power storage device 120a in FIG. 3A.

Figure 3C:
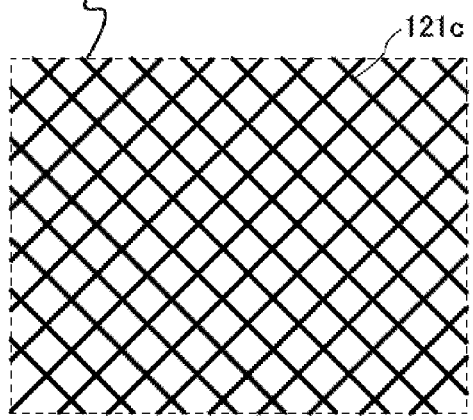

FIG. 3C illustrates a power storage device 120c having a planar shape in which thin line portions 121c are arranged diagonally to intersect one another. FIG. 3C corresponds to a power storage device that is obtained by 45° rotating the power storage device illustrated in FIGS. 1A and 1B and FIGS. 2A and 2B.

Figure 3D:
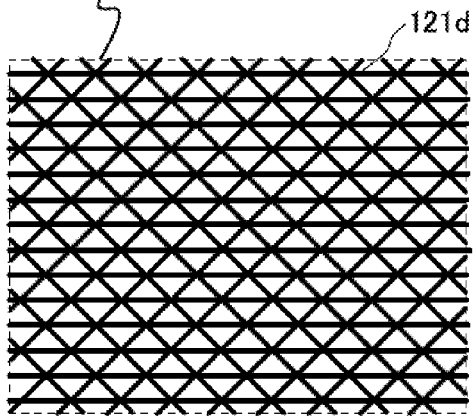

FIG. 3D is a plan view of a power storage device 120d having a planar shape having thin line portions 121d, which is obtained by adding horizontally extending thin line portions to the planar shape in FIG. 3C. Mechanical strength and a discharge capacitance to be formed are higher than those of the power storage device 120c in FIG. 3C.

Figure 3E:
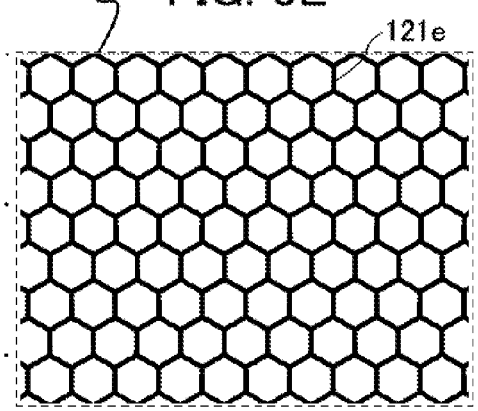

FIG. 3E is a plan view of a power storage device 120e having a honey-comb planar shape in which thin line portions 121e are provided such that the shapes of openings are regular hexagonal. This structure can include large openings and thus can ensure the transparency of the power storage device 120e and also achieve a power storage device with high mechanical strength.

Figure 3F:
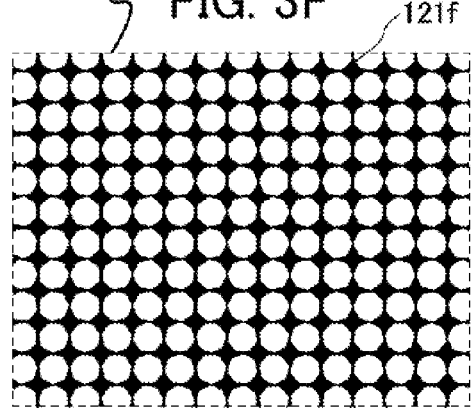

FIG. 3F is a plan view of a power storage device 120f having a planar shape in which thin line portions 121f are provided such that the shapes of openings are circular. In this power storage device, unlike in the above-described shapes, widths of the thin line portions 121f vary depending on positions.

In the above manner, the planar shape of the power storage device in one embodiment of the present invention is not limited to the above-described planar shapes, but can be a variety of shapes on the precondition that a plurality of openings through which external light passes are included.

This embodiment can be implemented combining with another embodiment as appropriate.

Embodiment 2

In this embodiment, an example in which a substrate is used for the power storage device described in Embodiment 1 will be described with reference to FIGS. 4A and 4B.

Figure 4A:
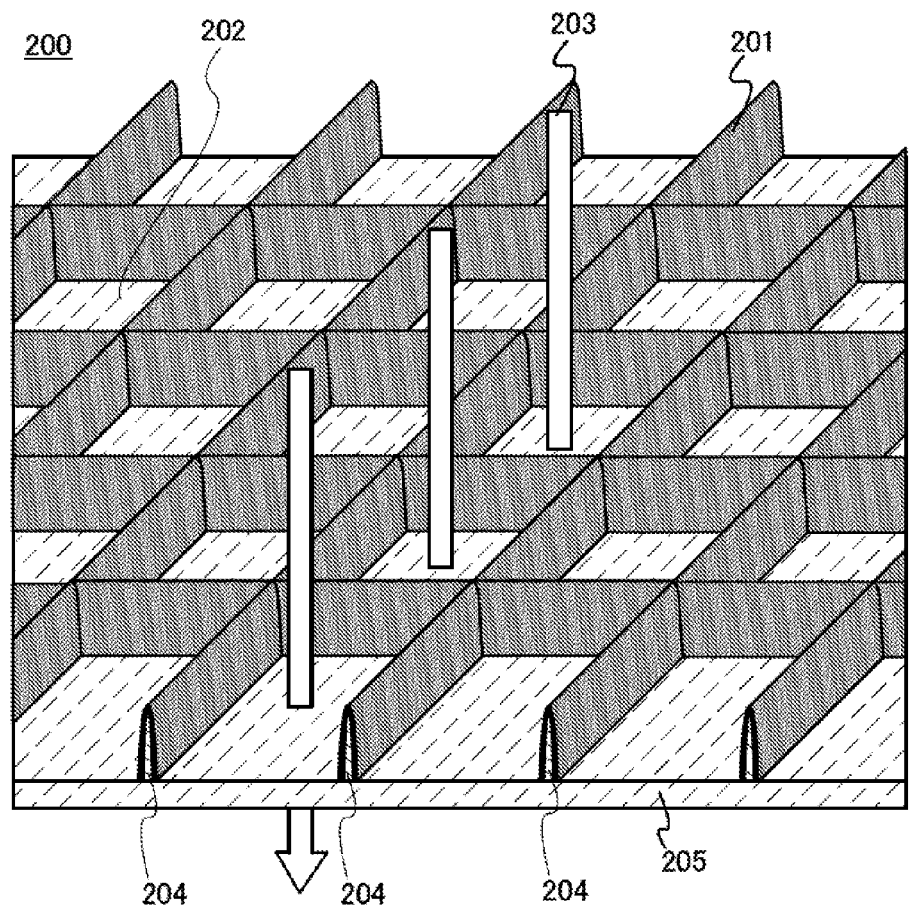
FIGS. 4A and 4B illustrate a power storage device.

As illustrated in FIG. 4A which is a perspective view of a power storage device 200, in the power storage device 200 according to this embodiment, a substrate 205 is provided below the power storage device 100 described in Embodiment 1. In other words, thin line portions 201 are formed over the substrate 205. The substrate 205 is formed using a member having a light-transmitting property. Therefore, external light 203 entering from an upper side of the thin line portions 201 passes through openings 202 and is transmitted through the substrate 205 to be extracted outside the power storage device 200. In contrast, external light (not shown) entering from a lower side of the power storage device 200 is transmitted through the substrate 205 and passes through the openings 202 to be extracted toward the upper side of the power storage device 200.

The substrate 205 is formed using a member having a light-transmitting property, and glass or quartz can be used, for example. Alternatively, a plastic film substrate, for example, a plastic substrate of polyethylene terephthalate (PET), polyether sulfone (PES), polyethylene naphthalate (PEN), polycarbonate (PC), nylon, polyetheretherketone (PEEK), polysulfone (PSF), polyether-imide (PEI), polyarylate (PAR), polybutylene terephthalate (PBT), or the like can be used, in which case the power storage device can be light-weight and flexible.

The use of the substrate 205 for the power storage device 200 can increase the mechanical strength of the power storage device 200.

The substrate 205 may be used at a stage of forming the thin line portions 201 or may be bonded after the thin line portions 201 are formed. Alternatively, the substrate 205 may be used at the stage of forming the thin line portions 201 and be removed after that.

Figure 4B:
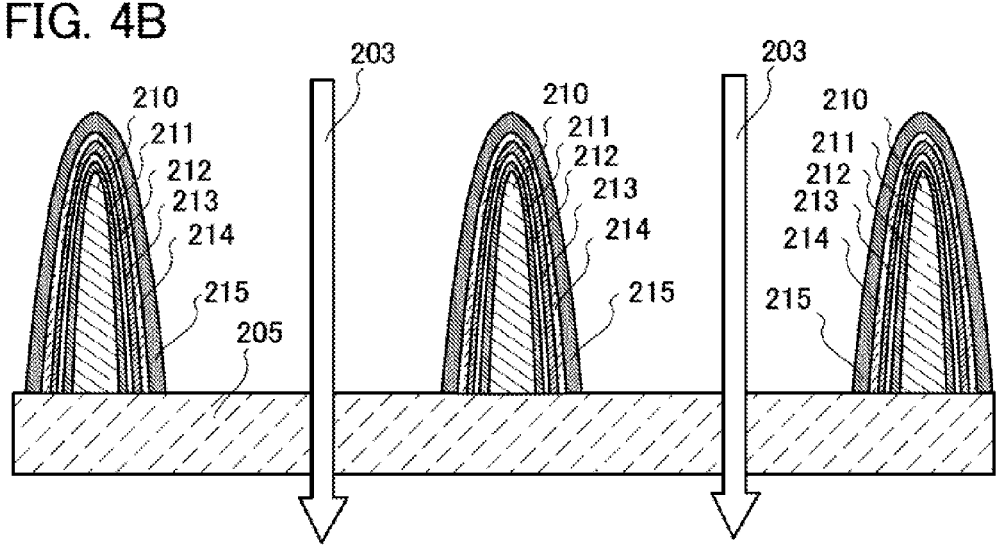

FIG. 4B illustrates a longitudinal cross section of the power storage device 200 including cross sections 204 of the thin line portions 201. Over the substrate 205, the thin line portions 201 having a net-like planar shape are formed, and in the thin line portion 201, a first current collector 210, a first active material layer 211, a solid electrolyte layer 212, a second active material layer 213, and a second current collector 214 are stacked in this order.

Here, in this embodiment, a sealing layer 215 is formed over the thin line portions 201. The sealing layer 215 is also referred to as a capping layer. The sealing layer 215 covers the entire exposed surface of the thin line portions 201. Thus, a battery structure can be shielded from the air. For the sealing layer 215, for example, an insulating material such as a resin, glass, an amorphous compound, or a ceramic can be used. The sealing layer 215 has a single layer structure or a stacked structure of these insulating materials.

Although the sealing layer 215 in FIGS. 4A and 4B is provided over the thin line portions 201, but the position of the sealing layer 215 is not limited to a region over the threads 201; the sealing layer 215 may be a continuous layer provided also over the substrate 205 located in the openings 202. In this case, the sealing layer 215 needs to be formed using a material having a light-transmitting property.

Further, a black pigment or dye may be dispersed in the sealing layer 215. Alternatively, as a film different from the sealing layer 215, a layer in which a black pigment or dye is dispersed (not shown) may be formed over the sealing layer 215. By forming a layer containing a black pigment or the like over the thin line portions 201, even when the second current collector 214 is formed using a member having a high reflectivity, such as aluminum, the reflection can be suppressed; thus, the power storage device 200 with high transparency can be manufactured.

In this embodiment, the substrate 205 is provided below the thin line portions 201 and the sealing layer 215 is provided to cover the thin line portions 201; however, the power storage device may have a structure including only one of the substrate 205 and the sealing layer 215.

This embodiment can be implemented combining with another embodiment as appropriate.

Embodiment 3

In this embodiment, an example in which an insulating layer is provided such that the openings of the power storage device described in Embodiment 2 are filled with the insulating layer will be described with reference to FIGS. 5A and 5B.

Figure 5A:
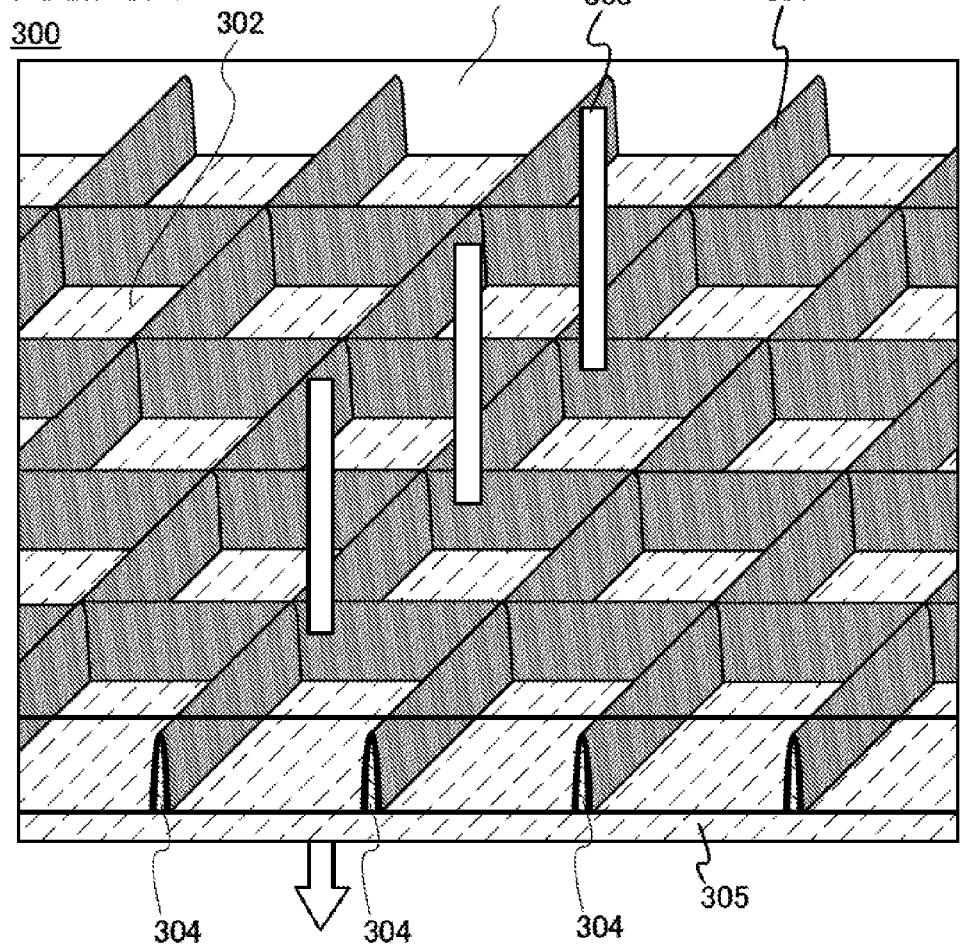
FIGS. 5A and 5B illustrate a power storage device.

FIG. 5A is a perspective view of a power storage device 300 according to this embodiment. In a manner similar to that in the power storage device described in Embodiment 2, the power storage device 300 includes thin line portions 301 and openings 302 over a substrate 305. In addition to the above structure, an insulating layer 316 is provided over the thin line portions 301 and over the openings 302 such that the openings 302 are filled with the insulating layer 316. The insulating layer 316 is formed using a material having a light-transmitting property. Therefore, external light 303 is transmitted through the insulating layer 316, the openings 302, and the substrate 305, to be extracted to a lower side of the power storage device 300.

Figure 5B:
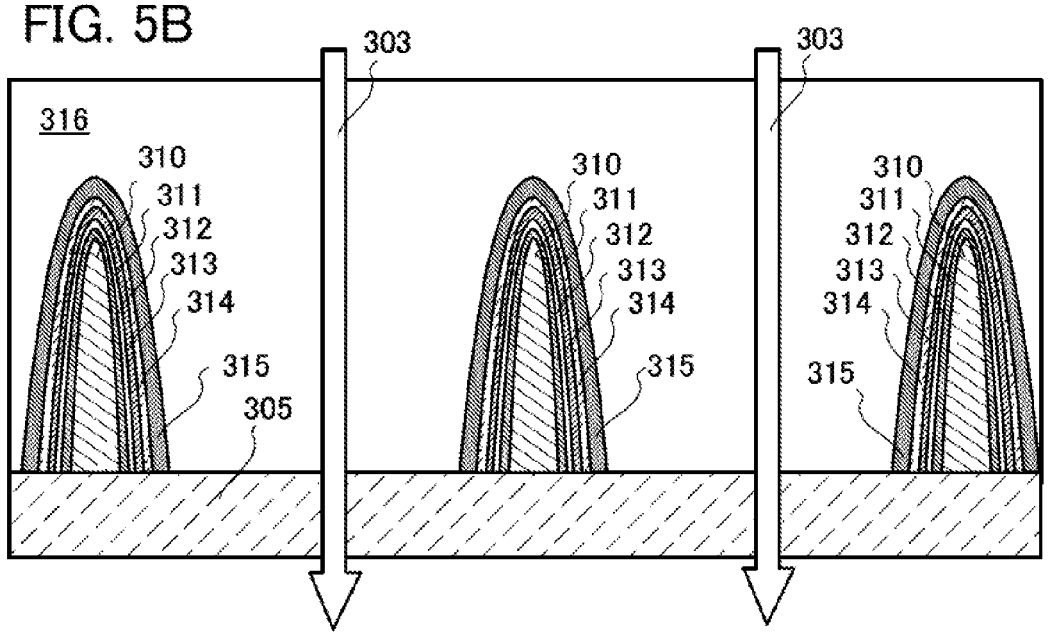

FIG. 5B illustrates a longitudinal cross-sectional structure of the power storage device 300 including cross sections 304 of the thin line portions 301. Over the substrate 305, the thin line portions 301 are formed in which a first current collector 310, a first active material layer 311, a solid electrolyte layer 312, a second active material layer 313, and a second current collector 314 are stacked in this order, and a sealing layer 315 is formed over the thin line portions 301. Note that the sealing layer 315 can be omitted as in the power storage device 100 described in Embodiment 1. The insulating layer 316 is formed over the thin line portions 301 or the sealing layer 315 and over the openings 302. FIG. 5B illustrates the insulating layer 316 having a flat surface; however, the shape is not particularly limited to this, and the insulating layer 316 may have an uneven shape that reflects the surface shape of the thin line portions 301, for example.

By providing the insulating layer 316 such that the openings 302 are filled with the insulating layer 316, the mechanical strength of the power storage device 300 can be higher. Further, by forming the insulating layer 316 using the same material as the sealing layer 315, a battery structure of the thin line portions 301 can be shielded from the air. Furthermore, by selecting a flexible material for the substrate 305 and by forming the insulating layer 316 using an elastic material such as rubber, a flexible power storage device that can be bent or curved can be achieved.

It is possible to form the insulating layer 316 using a film containing one or more kinds of an inorganic material (such as silicon oxide, silicon nitride, silicon oxynitride, or silicon nitride oxide) and a photosensitive or nonphotosensitive organic material (an organic resin material such as polyimide, an acrylic resin, polyamide, polyimide amide, resist, or benzocyclobutene), a stacked structure thereof, or the like. Alternatively, a siloxane resin may be used.

Note that a pigment or dye may be dispersed in the insulating layer 316. In this case, a predetermined wavelength of the external light 303 that passes through the openings 302 is absorbed; thus, a colored semitransparent power storage device can be manufactured.

This embodiment can be implemented combining with another embodiment as appropriate.

Embodiment 4

Next, a typical method for manufacturing the power storage device described in Embodiment 1 will be described with reference to FIG. 2B in this embodiment. Note that this embodiment will show a case where the first current collector 110 is a positive electrode current collector, the second current collector 114 is a negative electrode current collector, the first active material layer 111 is a positive electrode active material layer, and the second active material layer 113 is a negative electrode active material layer.

(Fabrication of First Current Collector)

First, a metal mesh to be the positive electrode current collector, which is the first current collector 110, is formed. A sheet-like or a plate-like conductive member having a desired area is subjected to a photolithography step and an etching step, so that the metal mesh having a net-like planar shape is formed.

For the sheet-like or plate-like conductive member, it is possible to use a highly conductive material such as a metal like stainless steel, gold, platinum, copper, iron, aluminum, titanium, chromium, cobalt, ITO (indium oxide-tin oxide), tin oxide, or indium oxide, or a stack or alloy thereof. The thickness of the conductive member corresponds to the height of the thin line portion 101 in the first current collector 110, and thus is set as appropriate in consideration of a desired discharge capacitance and the productivity of each thin film that is to be stacked thereover. For example, as the conductive member, a sheet, film, or plate with a thickness of greater than or equal to 1 µm and less than or equal to 5000 µm can be used.

The conductive member can be processed by a photolithography step. That is, a positive or negative photoresist is applied over the conductive member, and then the photoresist is exposed to light with use of a photomask having a chromium film that has been formed into a desired pattern over a quartz substrate in advance. After development and baking of the photoresist, the patterned photoresist is used as a mask to perform wet etching of the conductive member, so that a plurality of openings are formed in the conductive member. Thus, the first current collector 110 which is a metal thin film having a net-like planar shape is formed. After the formation of the openings, the photoresist mask is removed by ashing treatment or the like.

Both surfaces of the conductive member are preferably subjected to these photolithography and etching steps concurrently. The same photoresist pattern may be formed on both of the surfaces; however, by forming different patterns, a parabola longitudinal cross-sectional shape as illustrated in FIG. 2B can be formed.

Through the above steps, the first current collector can be formed to have a thin line portion having a width of greater than or equal to 1 µm and less than or equal to 2000 µm, preferably greater than or equal to 10 µm and less than or equal to 1000 µm, in a planar shape and to have an aperture ratio of greater than or equal to 20% and less than or equal to 95%, preferably greater than or equal to 30% and less than or equal to 80%.

Note that a support substrate may be provided on the back surface of the conductive member in order to support the conductive member during these photolithography and etching steps and the like and may be removed after completion of the steps.

Further, the surface of the conductive member that is formed to be net-like may be coated with a thin film of another metal by a plating process or the like.

Furthermore, before or after the processing of the conductive member, the conductive member may be subjected to a polishing process so as to be thin or flat.

In the above manner, by performing the photolithography and etching steps on the conductive member, the first current collector having a net-like planar shape is fabricated. However, the method for fabricating the first current collector is not limited to this method. For example, a photoresist pattern formed by a nanoimprint lithography may be used as a mask to perform wet etching on a conductive member so that a net-like metal mesh can be formed. Alternatively, without performing a photolithography step or an etching step, a net-like conductive member may be formed directly by a nanoimprint lithography, a printing method, an inkjet method, or the like. Further alternatively, a conductive member may be cut with an edge and the cut may be extended so that a net-like metal mesh can be formed. Further alternatively, openings may be formed by laser irradiation, punching or diecutting by pressing, or the like.

(Fabrication of Thin Line Portion)

Next, over the net-like positive electrode current collector (the first current collector 110) formed in the above manner, the positive electrode active material layer (the first active material layer 111), the solid electrolyte layer 112, the negative electrode active material layer (the second active material layer 113), and the negative electrode current collector (the second current collector 114) are stacked in this order, so that the thin line portions 101 are formed.

The positive electrode active material layer, the negative electrode active material layer, and the negative electrode current collector, which are included in the thin line portion 101, can be formed by a variety of vapor deposition method such as a sputtering method, a CVD method, an evaporation method, an ion plating method, or a laser ablation method, or another thin film forming method such as a plating method, a sol-gel method using a sol-gel solution, or a method in which a microparticle dispersion solution is applied and then baked. In particular, in a power storage device according to one embodiment of the present invention, each thin film is deposited over the net-like current collector having a predetermined height; accordingly, a method may be selected as appropriate such that the thin films are formed with high uniformity in thickness and that a deep portion (a root portion) of the current collector is well-covered. For example, these layers are formed by an RF magnetron sputtering method which is a kind of sputtering method.

The solid electrolyte layer 112 can be formed over the positive electrode active material layer by a thin film forming method such as a sputtering method, a spin coating method, or an inkjet method. The thickness of the solid electrolyte layer 112 is preferably greater than or equal to 500 nm and less than or equal to 5000 nm. This is because, although a general solid electrolyte has low ion conductivity and thus needs to be formed thin so as to have a low resistance, a too small thickness might generate a pinhole, resulting in a short circuit between the positive electrode and the negative electrode. In order to form the solid electrolyte layer 112 by a vapor deposition method such as a sputtering method, as in the formation of the positive electrode active material layer and the negative electrode active material layer, a method may be selected as appropriate such that the thin film is formed with high uniformity in thickness and a deep portion (a root portion) of the current collector is well-covered.

As a material for the solid electrolyte layer 112, it is possible to use a sulfide-containing solid electrolyte material such as $Li_2S$—$SiS_2$—$Li_3PO_4$, $Li_2S$—$P_2S_5$, $Li_2S$—$SiS_2$—$Ga_2S_3$, $LiI$—$Li_2S$—$P_2S_5$, $LiI$—$Li_2S$—$B_2S_3$, $LiI$—$Li_2S$—$SiS_2$, $Li_3PO_4$—$Li_2S$—$SiS_2$, or $Li_4SiO_4$—$Li_2S$—$SiS_2$ or an oxide-containing solid electrolyte material such as LiPON, $Li_2O$, $Li_2CO_3$, $Li_2MoO_4$, $Li_3PO_4$, $Li_3VO_4$, $Li_4SiO_4$, LLT ($La_{2/3-x}Li_{3x}TiO_3$), or LLZ ($Li_7La_3Zr_2O_{12}$).

When a high-molecular solid electrolyte such as PEO (polyethylene oxide) is used, the polymer solid electrolyte is deposited by a coating method or the like.

By the above fabrication method, the positive electrode active material layer, the solid electrolyte layer, the negative electrode active material layer, and the negative electrode current collector can be stacked in this order over the metal mesh.

With a single-wafer sputtering apparatus, this stacked structure over the metal mesh can be successively formed without exposure to the air. This successive formation can greatly increase the productivity of the power storage device.

That is, a structure of the power storage device according to one embodiment of the present invention can be manufactured by sequentially stacking the thin films over the first current collector by using the net-like first current collector, such as the metal mesh, as a base material; therefore, patterning steps for the thin films are unnecessary. Thus, a transparent power storage device can be manufactured effectively, and mass productivity is extremely high.

This embodiment can be implemented combining with another embodiment as appropriate.

Embodiment 5

Next, a battery pack including a power storage device described in any of Embodiments 1 to 4 will be described with reference to FIG. 6.

Figure 6:
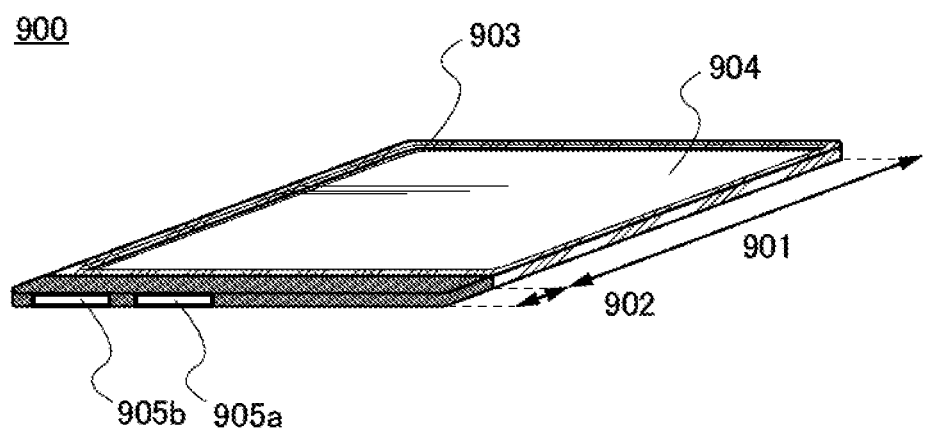
FIG. 6 illustrates a battery pack.

FIG. 6 is a schematic view of an example of a plate-like battery pack (a battery pack 900). The battery pack 900 according to one embodiment of the present invention is broadly divided into a battery portion 901 and a circuit portion 902. The battery portion 901 includes a transparent region 904, a frame 903 surrounding the transparent region 904, and the like. The power storage device described in any of Embodiments 1 to 4 is used in the transparent region 904. Since the power storage device according to one embodiment of the present invention transmits light, most of the battery pack 900 is transparent. The frame 903 has functions of supporting and fixing the thin power storage device as well as a function of showing the outline thereof for handling because the power storage device is transparent. Besides, the frame 903 has a function of protecting edge portions of the power storage device.

The transparent region 904 may include one power storage device or a plurality of arranged compact power storage devices.

The power storage device is thin and does not have a high strength and thus is not highly resistant to external stress. Accordingly, both surfaces of the power storage device are preferably covered with members such as glass substrates or transparent resins so as to protect and strengthen the power storage device.

The first current collector and the second current collector of the power storage device are connected to the circuit portion 902. The circuit portion 902 can include a circuit that achieves a battery management unit (BMU) and the like. The BMU conducts collection of data such as a cell voltage or cell temperature of the power storage device, observation of excessive charging and excessive discharging, observation of overcurrent, management of battery degradation state, calculation of state of charge (SOC), control of detection of malfunction, and the like. Further, in the circuit portion 902, it is effective to provide a positive temperature coefficient (PTC) element, which is a heat sensitive resistor whose resistance increases with an increase in the temperature of the power storage device, so as to prevent abnormal heating by limiting the amount of current by an increase in resistance. Note that barium titanate ($BaTiO_3$)-based semiconductor ceramic or the like can be used for the PTC element. The circuit portion 902 is connected to a positive electrode terminal 905a and a negative electrode terminal 905b.

Although the plate-like battery pack 900 illustrated in FIG. 6 is rectangular, the shape of the battery pack is not limited to this, but may be a given planar shape having a certain area, such as a polygon like a triangle, a square, or a hexagon, a circle, or an ellipse. In order to achieve this, the first current collector which serves as a base of the power storage device and is provided in the battery portion 901 is formed in any of the above shapes.

This embodiment can be implemented combining with another embodiment as appropriate.

Embodiment 6

A power storage device according to one embodiment of the present invention can be used as a power supply of various electric devices which are driven by electric power. In particular, taking the advantage of being transparent, the power storage device is preferably used such as to increase the designability of an electric device.

Specific examples of electric devices each using the power storage device according to one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, toys, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electrical tools, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by electric motors using electric power from the power storage devices are also included in the category of electrical appliances. Examples of the moving objects include electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the electric devices, the power storage device according to one embodiment of the present invention can be used as a main power supply for supplying enough electric power for almost the whole power consumption. Alternatively, in the electric devices, the power storage device according to one embodiment of the present invention can be used as an uninterruptible power supply which can supply electric power to the electric devices when the supply of electric power from the main power supply or a commercial power supply is stopped. Further alternatively, in the electric devices, the power storage device according to one embodiment of the present invention can be used as an auxiliary power supply for supplying electric power to the electric devices at the same time as the power supply from the main power supply or a commercial power supply.

Figure 7A:
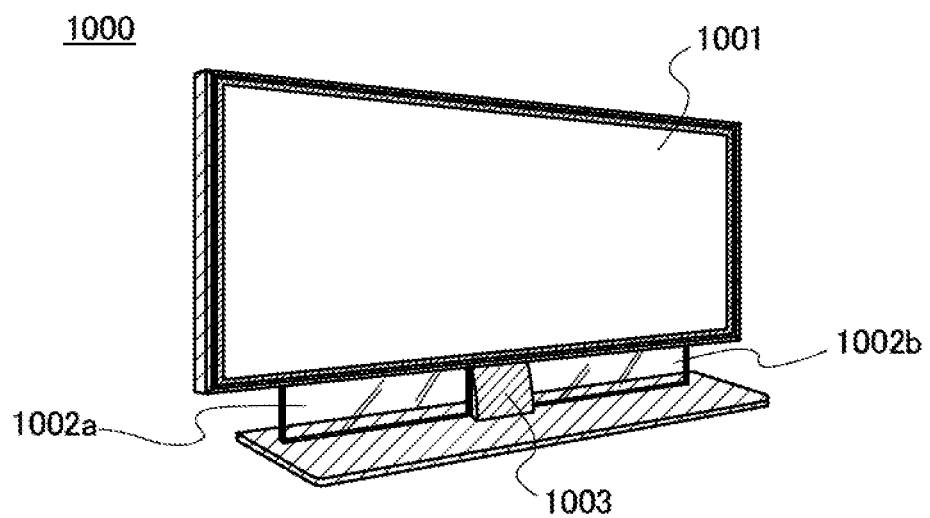
FIGS. 7A and 7B illustrate electric devices.
Figure 7B:
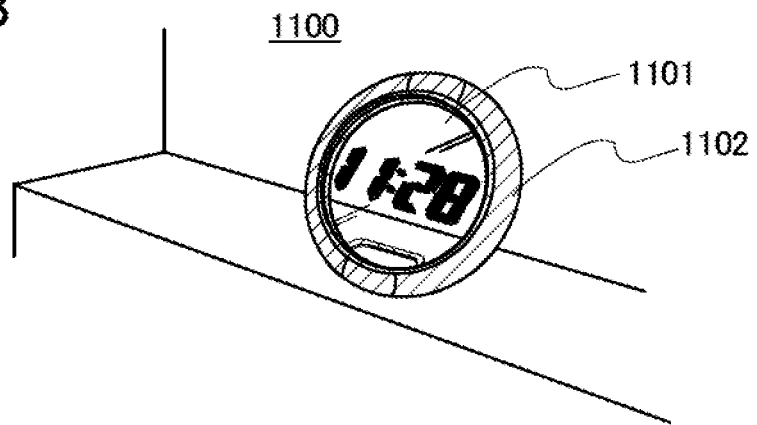

FIGS. 7A and 7B illustrate specific structures of the electric devices. In FIG. 7A, a display device 1000 is an example of an electric device including a power storage device according to one embodiment of the present invention. Specifically, the display device 1000 corresponds to a display device for TV broadcasting reception and includes a display portion 1001, power storage devices 1002a and 1002b, a circuit portion 1003 including a tuner, and the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), a field emission display (FED), and the like can be used for the display portion 1001.

The display device 1000 can receive electric power from a commercial power supply. Alternatively, the display device 1000 can use electric power stored in the power storage devices 1002a and 1002b. Thus, the display device 1000 can be operated with use of the power storage device according to one embodiment of the present invention as an uninterruptible power supply even when electric power cannot be supplied from the commercial power supply due to power failure or the like.

The power storage devices 1002*a* and 1002*b* according to embodiments of the present invention are positioned directly under the display portion 1001. The circuit portion 1003 is covered with a housing, whereas the power storage devices 1002*a* and 1002*b* are not covered with a housing, but are exposed. Since the power storage devices 1002*a* and 1002*b* are transparent, the back side of the display device 1000 can be seen through the power storage devices 1002*a* and 1002*b*; thus, the entire display device 1000 can be designed to look slim.

Note that the display device 1000 includes, in its category, all of information display devices for personal computers, advertisement displays, and the like besides TV broadcast reception. In particular, taking the advantage of transparency of the power storage device according to one embodiment of the present invention, transparent display devices for displaying information can be achieved.

FIG. 7B illustrates an example of a clock using the transparency of the power storage device. A clock 1100 illustrated in FIG. 7B is a table clock and includes an outer portion 1102 which does not transmit light and a transparent portion 1101 surrounded by the outer portion 1102.

In the transparent portion 1101, a display plate displaying the time overlaps with the transparent power storage device according to one embodiment of the present invention. For the display plate, for example, a segment type liquid crystal display device can be used. Since both the display plate and the power storage device are transparent, the clock 1100 can be designed such that the time displaying portion seems floating. Component members that do not have a light-transmitting property, such as a driver circuit of the display plate, are provided in the outer portion 1102.

Needless to say, there is no particular limitation to the above-described electric device as long as the power storage device according to one embodiment of the present invention is included.

This embodiment can be implemented combining with another embodiment as appropriate.

This application is based on Japanese Patent Application serial no. 2012-063807 filed with Japan Patent Office on Mar. 21, 2012, the entire contents of which are hereby incorporated by reference.

What is claimed is:

1. A power storage device comprising:
   a first current collector having a net-like shape;
   a first active material layer covering a top surface and a side surface of the first current collector;
   a solid electrolyte layer covering a top surface and a side surface of the first active material layer;
   a second active material layer covering a top surface and a side surface of the solid electrolyte layer; and
   a second current collector covering a top surface and a side surface of the second active material layer.

2. The power storage device according to claim 1, wherein the first current collector is a metal mesh.

3. The power storage device according to claim 1, wherein light passes through an opening included in the first current collector.

4. The power storage device according to claim 1, wherein in a part of a cross section of the first current collector, a ratio of a height to a width is more than 1.

5. An electric device comprising the power storage device according to claim 1.

6. A power storage device comprising:
   a substrate;
   a first current collector over the substrate, the first current collector having a net-like shape;
   a first active material layer covering a top surface and a side surface of the first current collector;
   a solid electrolyte layer covering a top surface and a side surface of the first active material layer;
   a second active material layer covering a top surface and a side surface of the solid electrolyte layer; and
   a second current collector covering a top surface and a side surface of the second active material layer.

7. The power storage device according to claim 6, wherein the first current collector is a metal mesh.

8. The power storage device according to claim 6, wherein light passes through an opening included in the first current collector.

9. The power storage device according to claim 6, wherein end portions of the first active material layer, the solid electrolyte layer, the second active material layer, and the second current collector are in contact with the substrate.

10. The power storage device according to claim 6, further comprising a sealing layer covering the second current collector.

11. The power storage device according to claim 6, further comprising an insulating film covering the second current collector and the substrate.

12. An electric device comprising the power storage device according to claim 6.

13. A power storage device comprising:
    a net-like structure having openings, the net-like structure comprising:
      a first current collector having a net-like shape;
      a first active material layer covering a top surface and a side surface of the first current collector;
      a solid electrolyte layer covering a top surface and a side surface of the first active material layer;
      a second active material layer covering a top surface and a side surface of the solid electrolyte layer; and
      a second current collector covering a top surface and a side surface of the second active material layer.

14. The power storage device according to claim 13, wherein the first current collector is a metal mesh.

15. The power storage device according to claim 13, wherein light passes through the openings.

16. The power storage device according to claim 13, further comprising a substrate under the net-like structure.

17. The power storage device according to claim 16, wherein end portions of the first active material layer, the solid electrolyte layer, the second active material layer, and the second current collector are in contact with the substrate.

18. The power storage device according to claim 13, further comprising a sealing layer covering the second current collector.

19. The power storage device according to claim 13, further comprising an insulating film covering the net-like structure and the openings.

20. An electric device comprising the power storage device according to claim 13.

21. The power storage device according to claim 13, wherein the net-like structure includes a tapered cross section.

* * * * *